Nov. 17, 1959 H. I. OSHRY ET AL 2,912,747
METHOD OF MAKING PRINTED CIRCUIT PANELS
Filed Nov. 7, 1955
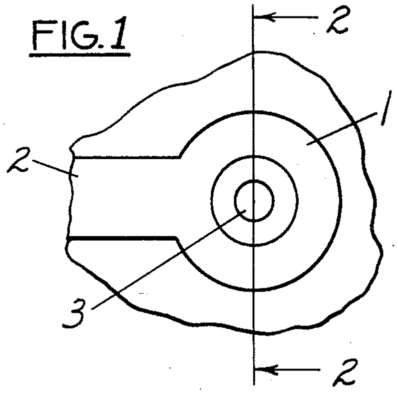
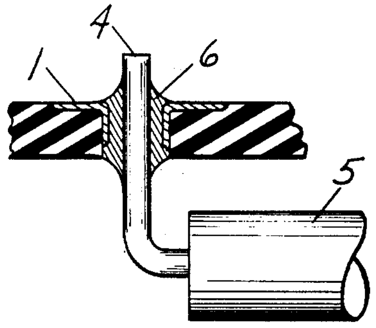
FIG. 2
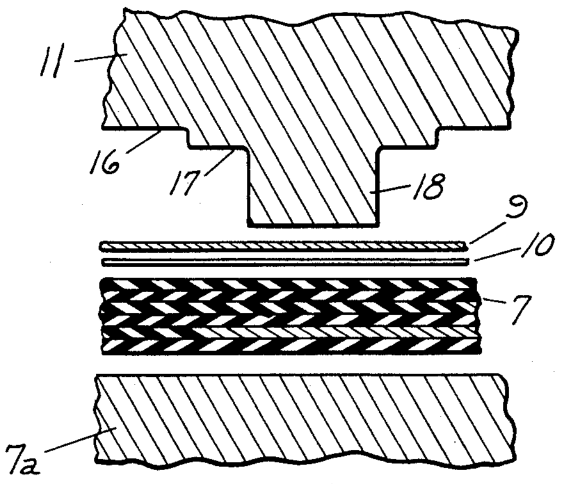
FIG. 3
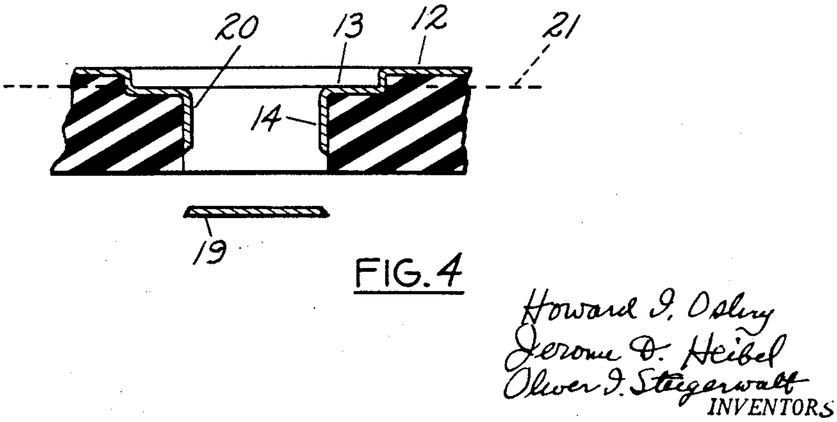
Howard I. Oshry
Jerome D. Heibel
Oliver I. Steigerwalt
INVENTORS
BY Ralph Hamman
Attorney United States Patent Office 2,912,747

Patented Nov. 17, 1959

2,912,747

METHOD OF MAKING PRINTED CIRCUIT PANELS

Howard I. Oshry, Oliver I. Steigerwalt, and Jerome D. Heibel, Erie, Pa., assignors to Erie Resistor Corporation, Erie, Pa., a corporation of Pennsylvania Application November 7, 1955, Serial No. 545,214

1 Claim. (Cl. 29—155.5)

Printed circuit wiring panels of foil clad plastic laminate require holes for a variety of purposes such as for fasteners, tube sockets, leads, terminals, etc. This invention is intended to simplify the hole forming operations by molding the holes as a part of the same operation which forms the laminate. This is particularly useful in devices disclosed in Patent 2,716,268.

The accompanying drawing of Fig. 1 is a top plan view of a small portion of a printed circuit wiring panel; Fig. 2 is a section on line 2—2 on Fig. 1; Fig. 3 is an exploded view illustrating the process of manufacture and Fig. 4 is a fragmentary section through the printed circuit wiring panel at the end of the molding operation and prior to the surface abrading operation.

In Fig. 1 is shown a view of a small part of a printed circuit wiring panel made in accordance with Patent 2,716,268. The complete panel will include a great many terminal areas 1 and circuit wiring interconnections 2 arranged to meet the particular circuit requirements. At the center of the terminal area 1 is a hole 3 for receiving a lead 4 of an electric circuit component 5 such as a resistor or condenser. The electrical connection between the lead 4 and the terminal area 1 is effected by solder 6. In addition other holes are required in the panel, for example, to receive tube sockets or for receiving fasteners for mounting the panel or for mounting devices on the panel. These holes obviously will be of different size and shape than the hole 3. Heretofore the most economical way of forming these holes has been by punching dies operating on the finished panels. These punching dies are expensive and while the holes punched are always in fixed relation to each other, variable shrinkage in the plastic resin material of which the circuit panels are most usually made results in misregistration of the punching dies with the individual elements of the panels.

In order to eliminate these problems, the holes are molded through the panel. A plurality of paper or like sheets 7 of fiber impregnated with uncured plastic as disclosed in Patent 2,175,268 are arranged on a heated lower platen **7*a*. On top of the sheets 7 is arranged a sheet 9 of metal foil with an underlying film 10 of adhesive which may be a separate film or a coating on the foil or a part of the plastic impregnated sheets 7. The sheets 7 are deformable under molding pressure so that when the upper heated platen 11 closes under molding pressure, the sheets 7 and foil 9 are consolidated to the finished shape shown in Fig. 4. When the part leaves the molding press, the foil 9 is adhesively united to the underlying plastic base which has been molded to the shape determined by the upper heated platen 11. In the molded piece shown in Fig. 4, there are sections 12 which are not wanted in the finished printed circuit panel, sections 13 which are to remain in the finished panel and indentations 14 which extend clear through the panel, except possibly for some flash. The portions 12 which are not wanted in the finished panel are located at the level of surfaces 16 on the upper platen 11. The surfaces 13 which are to remain in the finished panel are located at the level of surfaces 17 on the upper platen and the indentations 14 correspond to projection 18 on the upper platen. It will be appreciated that the shape of the surfaces 16, 17 and 18 on the upper heated platen 11** will vary widely with different panels.

At the end of the molding operation, the entire upper surface of the molded panel is covered with metal foil 9 which is both embossed to the configuration of the upper platen 11 and adhesively united to the panel. Usually there will be a section 19 of metal foil punched out of the hole 14 and there will also be sections 20 of foil drawn into and adhesively joined to the side walls of the hole. The sections 20 are desirable for soldered connections. There may be a flash of plastic at the bottom of the holes 14 which can be cleaned, for example, by sand blasting. Sand blasting will also remove any jagged edges of foil. Even if flash is present, the holes are still considered as extending through the panel. Holes of diameter ten or more times the thickness of the laminate are readily molded with the standard phenolic impregnated paper used in the manufacture of copper foil clad laminates such as used in the etched circuits. By the present method, as the laminate leaves the molding press the foil is embossed to the desired circuit pattern and holes are formed at the proper locations. This is all done in a molding cycle of the same length as that required for plain copper clad laminates for etched circuits.

The manufacture of the printed circuit panel is completed by grinding or cutting away the top surface of the molded panel to the depth of dotted line 21. The grinding to the depth of dotted line 21 removes the portions 12 which are not wanted in the completed panel. The grinding or cutting operation removing the material to the depth of the line 21 in no way affects the configuration of the conducting elements on the circuit panel such as indicated at 1 and 2. The grinding or cutting operations require no special tools. A drum sander is satisfactory. With this method of forming the holes, there is no possibility of misregistration of the holes with respect to the portions 13 which are to remain in the finished printed circuit panel. The registration of the holes is determined by the molding die 11 and variations in shrinkage in the molded plastic and in no way affect the registration. Accordingly, the holes formed in this manner are more accurately located than those which can be formed by punching dies.

The embossing of the foil and indentations can be carried out in a standard laminating press such as used in the manufacture of plain foil clad laminates. These presses make large sheets which can be cut up to make many printed circuit panels.

What is claimed as new is:

The method of making a printed electric circuit panel comprising a panel of insulating plastic laminate subject to variation in shrinkage and having disposed on a surface thereof conductive terminal areas and associated circuit wiring interconnections and having holes extending through the panel accurately registering with the terminal areas, which comprises arranging a metal foil on one surface of an uncured deformable base sheet of fibers of insulating material and an impregnating plastic and including adhesive material under the foil, positioning a die on the foil having embossing projections thereon consisting of projections forming indentations corresponding to terminal areas and circuit interconnections between the terminal areas and further consisting of hole forming projections in register with the projections forming the terminal area indentations, said hole forming projections extending from the terminal area forming projections and extending through to but not beyond the opposite surface of the base sheet, supporting said opposite surface of the base sheet throughout the area opposite the die, pressing the die, foil and base together in a press having platens heated to the flowing temperature of the impregnating plastic under pressure sufficient to emboss the foil under the projections into the underlying surface of the base and to cause substantially all the fibers and plastic to flow around and from under the hole forming projections and the foil to be drawn into the holes formed by the hole forming projections and maintaining the pressure until the plastic is cured and the foil is united and consolidated with the base and with the inner surface of the holes in the base, and cutting away the foil coated surface of the base to a depth below that of the unembossed portions of the foil to leave only the embossed portions of the foil united with the base and with the inner surface of the holes in the base.

References Cited in the file of this patent

UNITED STATES PATENTS

| | | |
|---|---|---|
| 2,320,498 | Wheeler | June 1, 1943 |
| 2,482,981 | Kamrass | Sept. 27, 1949 |
| 2,633,441 | Buttress | Mar. 31, 1953 |
| 2,716,268 | Steigerwalt | Aug. 30, 1955 |